United States Patent [19]
Takasan et al.

[11] Patent Number: 5,886,619
[45] Date of Patent: Mar. 23, 1999

[54] COMMUNICATION METHOD IN MOVABLE BODY OPERATING SYSTEM

[75] Inventors: Masaki Takasan; Yasuharu Odachi; Mitsuhiro Mabuchi, all of Kariya, Japan

[73] Assignee: Kabushiki Kaisha Toyoda Jidoshokki Seisakusho, Kariya, Japan

[21] Appl. No.: 834,367

[22] Filed: Apr. 16, 1997

[30] Foreign Application Priority Data

Apr. 19, 1996 [JP] Japan .................................... 8-098398
Apr. 19, 1996 [JP] Japan .................................... 8-098399

[51] Int. Cl.$^6$ ................................................ H04M 11/04
[52] U.S. Cl. .............................. 340/310.06; 340/310.01; 340/310.07; 104/297; 191/33 R; 191/50; 246/4
[58] Field of Search ........................ 340/310.01, 310.06, 340/310.07; 104/88.03, 88.04, 295, 297; 191/33 R, 29 R, 45 R, 50; 246/3, 4

[56] References Cited

U.S. PATENT DOCUMENTS

| | | | |
|---|---|---|---|
| 3,714,419 | 1/1973 | Fosse et al. ........................ | 340/310.07 |
| 3,794,833 | 2/1974 | Blazek et al. ......................... | 246/63 C |
| 4,905,605 | 3/1990 | Shishido et al. .......................... | 104/93 |
| 5,142,277 | 8/1992 | Yaberry et al. ..................... | 340/310.01 |
| 5,289,778 | 3/1994 | Romine .................................... | 104/130 |

*Primary Examiner*—David J. Wu
*Attorney, Agent, or Firm*—Morgan & Finnegan, L.L.P.

[57] ABSTRACT

In an operating system for a movable body that runs on a guide rail, a communication method is described that establishes communications between the movable body and an operation control unit for controlling running of the movable body. Power lines on which electric power is transmitted are laid on the guide rail. The movable body is runnable upon reception of the electric power from the power lines. The method includes the steps of (a) generating a communication signal in either the movable body or the operation control unit; (b) superimposing the communication signal on electric power to be transmitted on the power lines; (c) receiving the electric power with the superimposed communication signal at the other of the movable body or the operation control unit; and (d) acquiring the communication signal from the received electric power.

9 Claims, 9 Drawing Sheets

5,886,619

COMMUNICATION METHOD IN MOVABLE BODY OPERATING SYSTEM

BACKGROUND OF THE INVENTION

1. FIELD OF THE INVENTION

The present invention relates to an operating system for movable electrically powered bodies that run along a guide rail in a trolley system or a non-contact system. More particularly, this invention relates to a communication method in a movable body operating system, which is executed between movable bodies and a ground station.

2. DESCRIPTION OF THE RELATED ART

According to one conventionally proposed movable body operating system, one or a plurality of movable bodies run on a guide rail that is laid on a ceiling. Loads put on the movable bodies are conveyed together with the movable bodies, ensuring efficient distribution within a factory or a warehouse. A motor is generally used to move a movable body. A 3-phase AC supply voltage, which has a voltage of 200 volts (or 100 volts) and a frequency of 60 hertz or (50 hertz), is supplied to the motor via power supply lines (trolley lines) that are laid on the side of the guide rail.

There are two ways to supply electric power to each motor: the trolley system and the non-contact system. In the trolley system, a collector ring provided in each movable body contacts the power supply lines, and electric power is supplied to the movable body. Each movable body has a rectifier for rectifying the supplied AC supply voltage and an inverter for performing AC conversion of the rectified supply voltage and supplying the AC-converted supply voltage to the induction drive motor. The movable body further converts the AC supply voltage to a DC voltage in order to supply a drive voltage to the control unit for the induction motor.

In the non-contact system, a pickup coil is provided on each movable body at a position close to the power supply lines. As this pickup coil generates induced electromotive force, electric power is supplied to the movable body.

In the trolley system and the non-contact system, the driving of movable bodies is controlled based on an instruction signal from an operation control unit (so-called ground station). The ground station and each movable body are equipped with communication devices for effecting mutual communications necessary for operating the movable body. The trolley system employs a cable-based communication method, whereas the non-contact system may employ a cable-based communication method or a wireless communication method.

In the cable-based communication, a communication line (a trolley line for communications) is laid in parallel to the power supply lines along the guide rail. The communication line has one end connected to the ground station. The other end is contactable with the collector ring of each movable body. Accordingly, the movable bodies communicate with the ground station while running via the communication line.

When the guide rail is laid around a wide area, it takes considerable efforts and time in laying the communication line along the guide rail. Further, the collector ring and the communication line that contacts the collector ring will wear after a given time. This wear leads to improper contact between the communication line and the collector ring, which may cause communication failure. It is therefore necessary to regularly replace the communication line or each collector ring. Furthermore, laying the communication line along the guide rail inevitably enlarges the guide rail and complicates the shape of the guide rail.

In the wireless communication, when the guide rail is laid around a wide area, the ground station has a plurality of radio devices located at proper locations to reliably carry out wireless communication with the movable bodies. This requires a plurality of communication cables to electrically connect one ground station to the individual radio devices. The laying of the communication cables requires a great deal of labor and time. Further, it takes much time and effort to select the sites for the radio devices to ensure reliable communications with the movable bodies.

SUMMARY OF THE INVENTION

Accordingly, it is a primary objective of the present invention to provide a communication method in a movable body operating system which can reduce the work of laying communication lines. The present invention can be implemented in numerous ways, including as an apparatus and method.

One aspect of the invention relates to a communication method in an operating system for a movable body that runs on a guide rail, for establishing communications between the movable body and an operation control unit for controlling running of the movable body. Power lines on which electric power is transmitted are laid on the guide rail. The movable body is runnable upon reception of the electric power from the power lines. The method includes the steps of: (a) generating a communication signal in one of the movable body and the operation control unit; (b) superimposing the communication signal on electric power to be transmitted on the power lines; (c) receiving the electric power with the superimposed communication signal at the other one of the movable body and the operation control unit; and (d) acquiring the communication signal from the received electric power.

The movable body has a reception antenna and a transmission antenna, both in proximity to the power lines. The step (b) includes a step of superimposing a communication signal from the movable body on electric power to be transmitted onto the power lines using the transmission antenna. The step (c) includes a step of receiving the electric power with superimposed communication signal from the operation control unit using the reception antenna.

The operation control unit has a reception antenna and a transmission antenna both in proximity to the power lines. The step (b) includes a step of superimposing a communication signal from the operation control unit on electric power to be transmitted onto the power lines using the transmission antenna. The step (c) includes a step of receiving the electric power with superimposed communication signal from the movable body unit using the reception antenna.

Another aspect of the invention relates to a communication method in an operating system for a movable body that runs on a guide rail, for establishing communications between the movable body and an operation control unit for controlling running of the movable body. Trolley lines on which electric power is transmitted are laid on the guide rail. The movable body has a collector ring contactable with the trolley lines to receive the electric power. The operation control unit has a first reception antenna and a first transmission antenna both in proximity to the trolley lines. The movable body has a second reception antenna and a second transmission antenna both in proximity to the trolley lines. The method includes the steps of: (a) generating a first communication signal in the operation control unit; (b) superimposing the first communication signal on electric power to be transmitted on the trolley lines using the first transmission antenna; (c) receiving the electric power with the superimposed first communication signal at the movable body using the second reception antenna; (d) acquiring the first communication signal from the received electric power; (e) generating a second communication signal in the movable body; (f) superimposing the second communication signal on electric power to be transmitted on the trolley lines using the second transmission antenna; (g) receiving the electric power with the superimposed second communication signal at the operation control unit using the first reception antenna; and (h) acquiring the second communication signal from the received power.

The method is adaptable to the following case. AC lines on which electric power is transmitted are laid on the guide rail. The movable body has an induction coil, arranged in the vicinity of the AC lines, for receiving electric power transmitted on the AC lines and generating induced electromotive force according to the electric power.

In yet another aspect of the invention, a movable body operating system includes a guide rail, a movable body runnable on the guide rail, and trolley lines laid along the guide rail on which electric power is transmitted. The movable body has a collector ring contactable with the trolley lines to receive the electric power therefrom and has a drive motor to be driven by the electric power. The movable body operating system further includes an operation control unit for generating a digital instruction signal for the movable body. The operation control unit includes a first modem for converting the digital instruction signal to an analog communication signal and a control transmission antenna connected to the first modem. The antenna is located in the vicinity of the trolley lines. The control transmission antenna is used for receiving the analog communication signal from the first modem and superimposing the analog communication signal on electric power to be transmitted on the trolley lines. The movable body includes a mobile reception antenna, a second modem and an operation controller. The mobile reception antenna is located in the vicinity of the trolley lines and receives electric power on which the analog communication signal transmitted on the trolley lines is superimposed. The second modem is connected to the mobile reception antenna. The second modem receives the received electric power from the mobile reception antenna and extracts the analog communication signal from the electric power to generate the digital instruction signal. The operation controller is connected to the second modem. The operation controller receives the digital instruction signal from the second modem and controls driving of the drive motor in accordance with the digital instruction signal.

In the movable body operating system, the trolley lines may be replaced with AC lines. The movable body may be replaced with a following movable body. The movable body may have an induction coil, arranged in the vicinity of the AC lines, for receiving electric power transmitted on the AC lines. The induction coil generates induced electromotive force according to the electric power. The movable body has a drive motor to be driven by the induced electromotive force.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with the objects and advantages thereof, may best be understood by reference to the following description of the presently preferred embodiments together with the accompanying drawings in which.

DETAILED DESCRIPTION OF THE PREFERRED EMBODIMENTS

Figure 1:
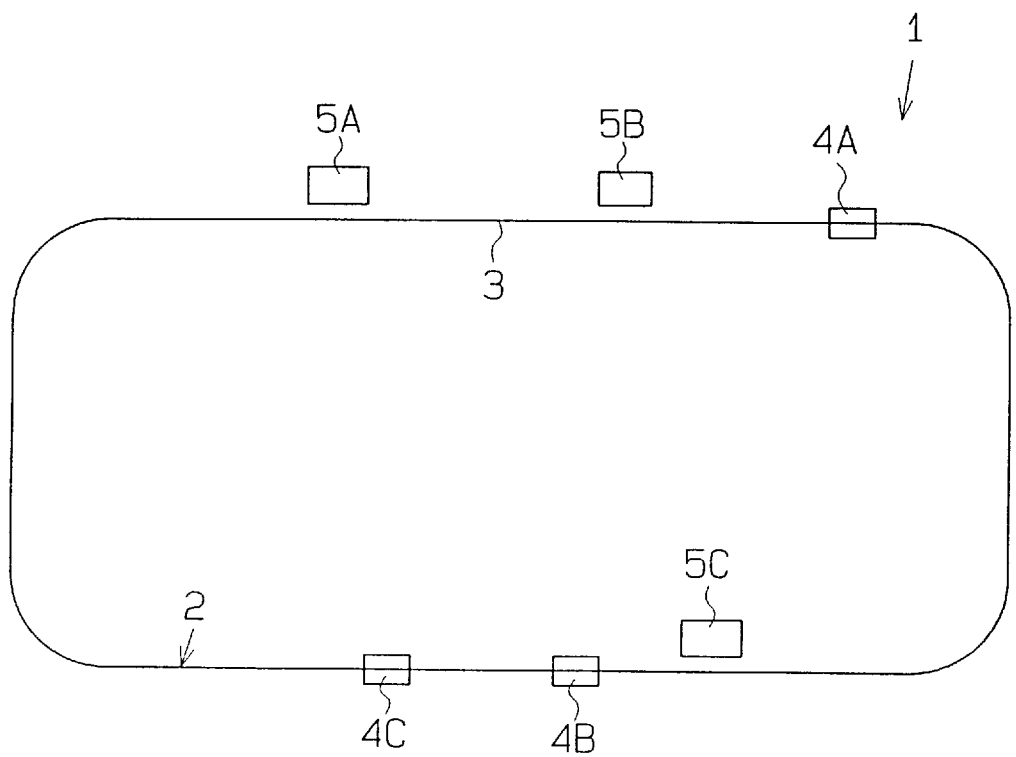
FIG. 1 shows the layout of an unmanned conveying system according to the invention.

An unmanned conveying system of a trolley type according to a first embodiment of the invention will now be described with reference to the accompanying drawings. FIG. 1 shows the layout of a conveying system 1. The conveying system 1 is equipped with a guide rail 3 (see FIG. 2), which is laid on a ceiling 2a and is formed in a closed loop shape, and a plurality of carriages 4A to 4C, which run on the guide rail 3. The guide rail 3 forms a running path 2 for the carriages 4A–4C. The conveying system 1 further includes a plurality of stations 5A to 5C located at predetermined intervals in the proximity of the guide rail 3. The stations 5A–5C have conveyors (not shown) for exchanging loads with the carriages 4A–4C.

Figure 2:
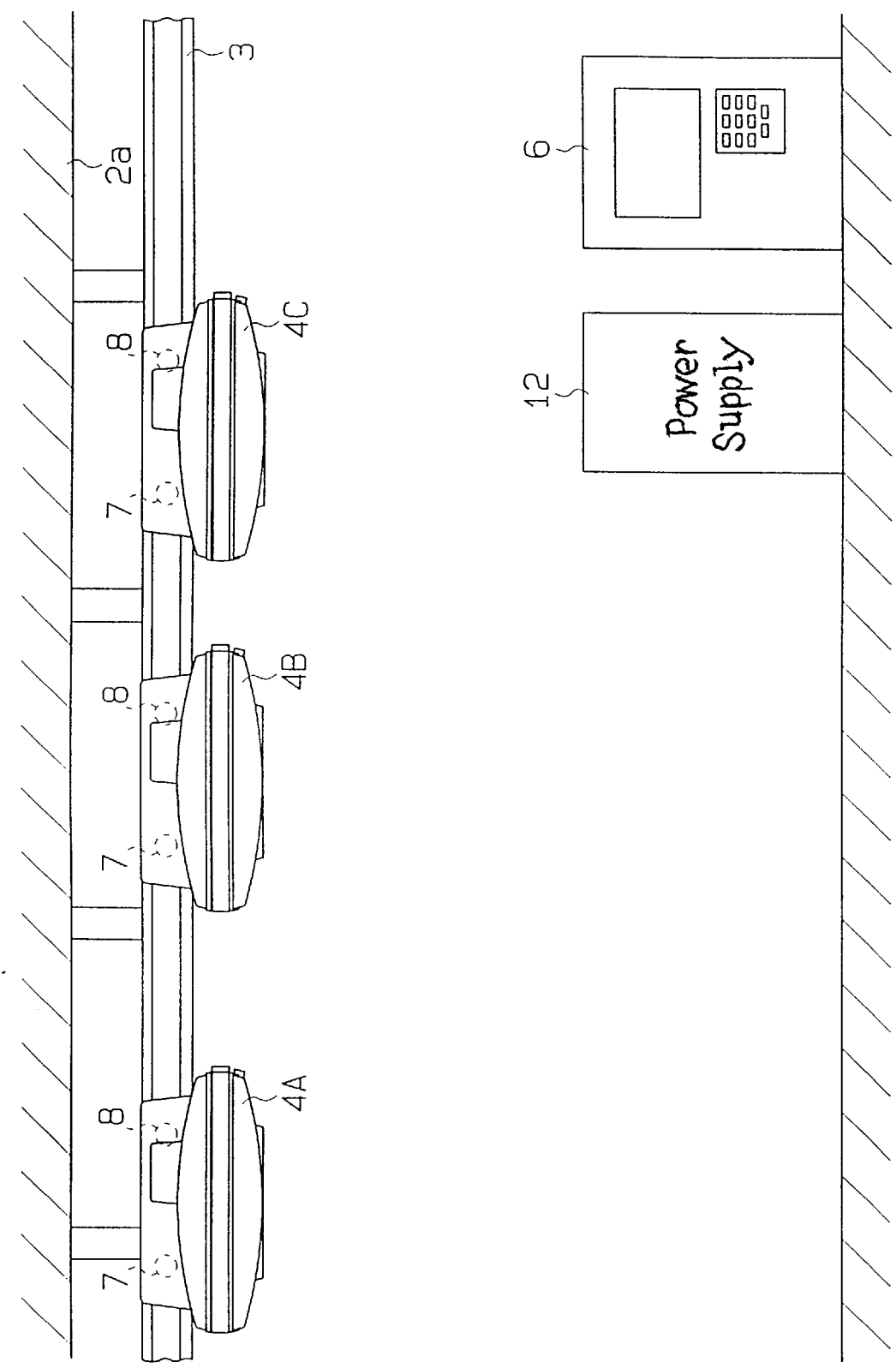
FIG. 2 illustrates carriages suspended from a guide rail in the unmanned conveying system in FIG. 1.

As shown in FIG. 2, the conveying system 1 has a power supply unit 12 and an operation control unit 6, which is located on the ground to control the running of the individual carriages 4A–4C and the loading/unloading thereof. According to this embodiment, the power supply unit 12 is a 3-phase AC power supply having a voltage of 200 volts and a frequency of 60 hertz (or 50 hertz).

Figure 3:
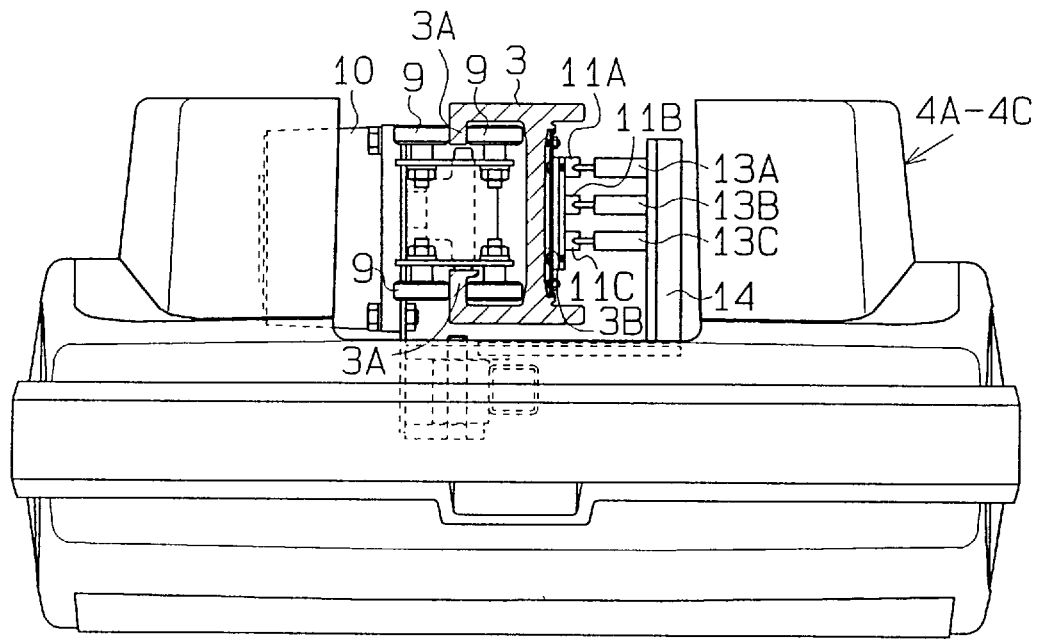
FIG. 3 is a front view of a carriage showing the relationship between a collector ring and trolley lines according to a first embodiment of the invention.

As shown in FIGS. 2 and 3, each of the carriages 4A–4C has a drive wheel 7 and a driven wheel 8 to run on the guide rail 3. The guide rail 3 has a pair of flanges 3A and a side 3B. Each of the carriages 4A–4C has two pairs of guide wheels 9, which respectively hold the pair of flanges 3A of the guide rail 3. Those two pairs of guide wheels 9 hold each carriage 4A, 4B or 4C suspended from the guide rail 3. Each of the carriages 4A–4C has a drive motor for driving the drive wheel 7. The drive motor 10 is a 3-phase induction motor in this embodiment.

Three trolley lines 11A to 11C are laid on the side 3B of the guide rail 3. The three trolley lines 11A–11C are connected to the power supply unit 12 via three power lines 24A to 24C (see FIG. 5) respectively. A first bracket 14 is provided on the base (not shown) of each carriage 4A, 4B or 4C at a predetermined distance apart from the three trolley lines 11A–11C. Supported on this first bracket 14 are three collector rings 13A to 13C, which are connectable to and disconnectable from the trolley lines 11A–11C. When the individual collector rings 13A–13C contact the respective trolley lines 11A–11C, a 3-phase AC supply voltage is supplied to the carriages 4A–4C from the power supply unit 12.

Figure 7:
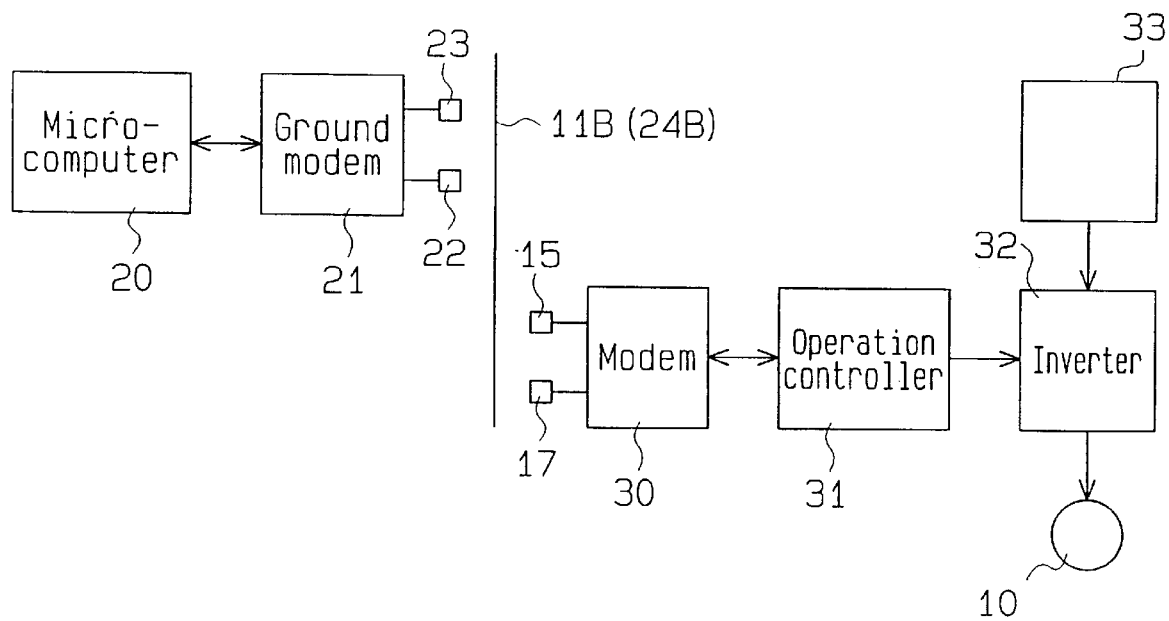
FIG. 7 illustrates how to make communication between a carriage and the operation control unit according to the first embodiment of the invention.

The 3-phase AC supply voltage is rectified by a rectifier (not shown), and the rectified supply voltage is converted by a DC-DC converter 33 (see FIG. 7). The converted supply voltage is then converted to an AC supply voltage by an inverter 32 (see FIG. 7). The converted AC supply voltage is supplied as a drive voltage to the drive motor 10.

Figure 4:
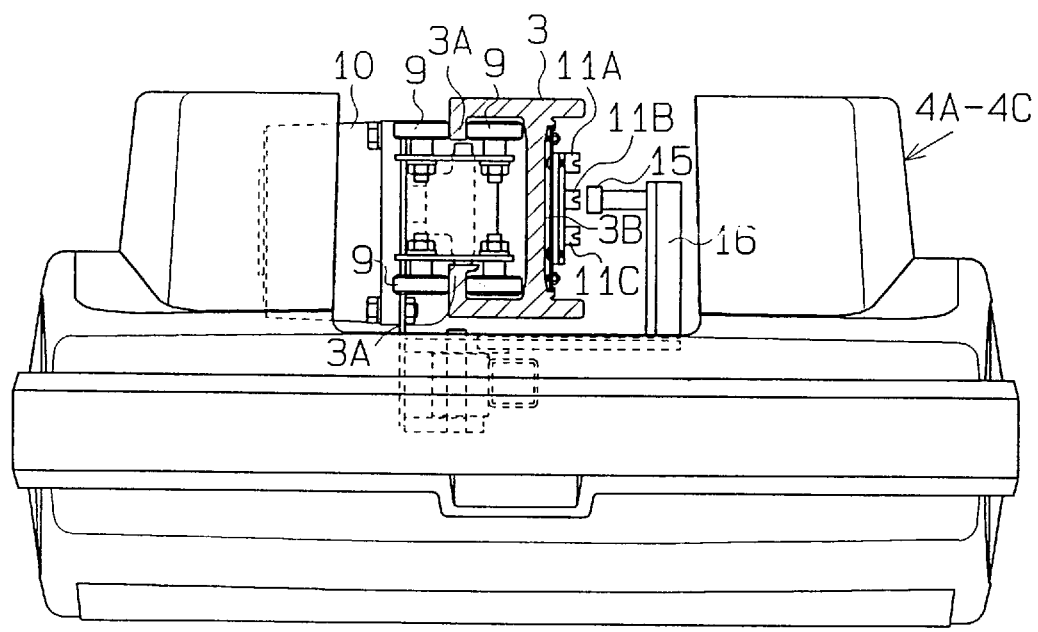
FIG. 4 is a front view of a carriage showing the relationship between a reception antenna and the trolley lines according to the first embodiment of the invention.

As shown in FIG. 4, a second bracket 16 and a third bracket (not shown) are provided on the base (not shown) of each of the carriages 4A–4C at predetermined distances apart from the three trolley lines 11A–11C and in parallel to the first bracket 14. A reception antenna 15 is supported on the second bracket 16. The reception antenna 15, which extends toward the trolley line 11B, has a distal end in proximity to the trolley line 11B. The reception antenna 15 serves to receive a communication signal from the operation control unit 6, which instructs the operation of the carriage.

A transmission antenna 17 (see FIG. 5) is supported on the third bracket. Like the reception antenna 15, the transmission antenna 17, which extends toward the trolley line 11B, has a distal end in proximity to the trolley line 11B. The transmission antenna 17 serves to transmit a communication signal indicating the operational status of the associated carriage 4A, 4B or 4C to the operation control unit 6. According to the first embodiment, the reception and transmission antennas 15 and 17 are formed in a coil shape.

Figure 5:
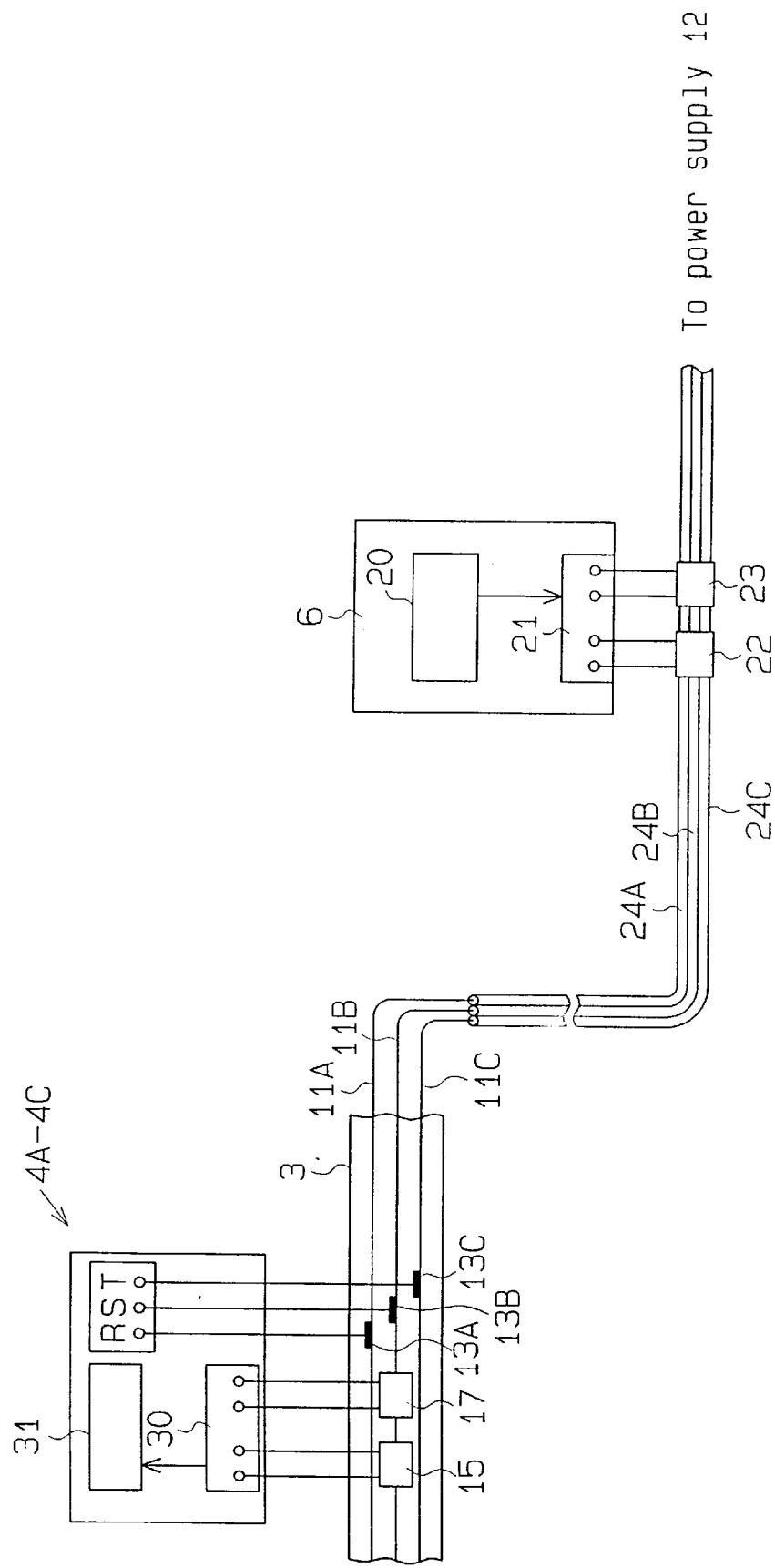
FIG. 5 shows a power supply path, a carriage and an operation control unit in a wireless conveying system according to the first embodiment of the invention.

As shown in FIGS. 5 and 7, the operation control unit 6 includes a microcomputer 20 and a modem (ground modem) 21. The microcomputer 20 generates a digital control instruction signal for moving the individual carriages 4A–4C and accomplishing the loading or unloading thereof and supplies the digital instruction signal to the modem 21. The modem 21 receives the digital instruction signal and converts it to an analog instruction signal having a frequency of 200 to 300 megahertz. The modem 21 electrically connects a ground transmission antenna 22 and a ground reception antenna 23 to each other. The ground transmission antenna 22 serves to receive an analog instruction signal from the modem 21 and send out a communication signal SG. The ground reception antenna 23 serves to receive the communication signals SG from the individual carriages 4A–4C.

The ground transmission antenna 22 is a coil-shaped antenna located around the power lines 24A–24C via an insulator. The ground reception antenna 23 is likewise a coil-shaped antenna put around the power lines 24A–24C via an insulator member. The ground transmission and reception antennas 22 and 23 may be located around only the power lines 24B, which are connected to the trolley line 11B. Those antennas 15, 17, 22 and 23 may have shapes other than a coil, such as a rod or plate.

Figure 6A:
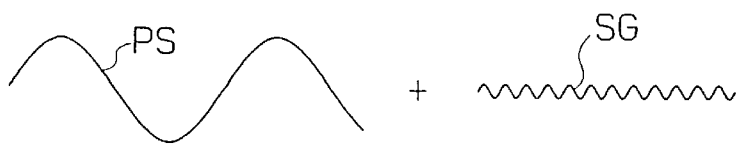
FIG. 6A shows the waveforms of electric power and a communication signal.
Figure 6B:
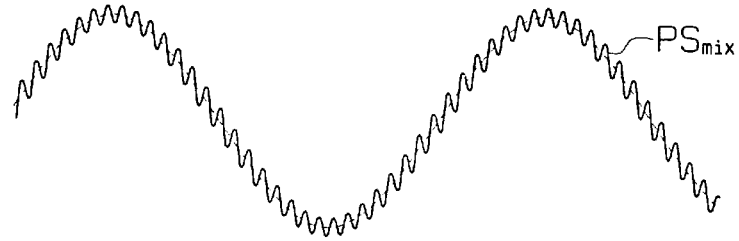
FIG. 6B shows the waveform of electric power on which the communication signal is superimposed.

When the communication signal SG is sent from the ground transmission antenna 22, the communication signal SG having a frequency of 200 to 300 megahertz is superimposed on electric power PS, which flows in the power lines 24A–24C and has a frequency of 60 hertz, as shown in FIG. 6A. Electric Power PSmix having the communication signal SG superimposed thereon is transferred to the trolley lines 11A–11C as shown in FIG. 6B.

As shown in FIGS. 5 and 7, each of the carriages 4A–4C has a modem 30 electrically connected to the reception antenna 15 and the transmission antenna 17, and each has an operation controller 31 electrically connected to the modem 30. The reception antenna 15 receives the electric power PSmix with the superimposed communication signal SG via the trolley line 11B and generates feeble induced electromotive force corresponding to the electric power PSmix. This induced electromotive force, which includes the communication signal SG superimposed on the electric power PS, is supplied to the modems 30 of the individual carriages 4A–4C.

Figure 6C:
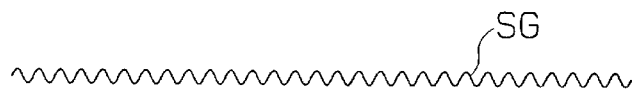
FIG. 6C shows the waveform of the communication signal extracted from the electric power in FIG. 6B.

As shown in FIG. 6C, the modem 30 receives the induced electromotive force and separates the communication signal SG and electric power PS, included in this induced electromotive force, from each other using a filter. The modem 30 then converts the acquired communication signal SG to a digital instruction signal and sends the digital instruction signal to the operation controller 31.

As shown in FIG. 7, the operation controller 31 receives the digital instruction signal from the modem 30 and determines if this instruction signal is addressed to itself. When the instruction signal is addressed to itself, the operation controller 31 supplies a control signal to the inverter 32 according to that instruction signal. The inverter 32 receives the voltage-converted supply voltage from the DC-DC converter 33 and drives the drive motor 10 in accordance with the control signal.

At the time of transmitting a signal from each of the carriages 4A–4C, the operation controller 31 supplies a digital signal indicating the operational status of the associated carriage 4A, 4B or 4C to the modem 30. The modem 30 converts the digital signal to an analog signal having a frequency of 200 to 300 megahertz. This analog signal is sent out as a communication signal SG from the transmission antenna 17 to the trolley line 11B and is superimposed on the electric power PS having a frequency of 60 hertz. The electric power PSmix with the superimposed communication signal SG is sent to the power line 24B. The ground reception antenna 23 receives the electric power PSmix with the superimposed communication signal SG through the power line 24B and generates feeble induced electromotive force corresponding to the electric power PSmix. The induced electromotive force including the communication signal SG superimposed on the electric power PS is supplied to the ground modem 21.

As shown in FIG. 6C, the ground modem 21 receives the induced electromotive force and separates the communication signal SG and power PS, included in the induced electromotive force, from each other using a filter to acquire the communication signal SG. The modem 21 converts the acquired communication signal SG to a digital signal and sends the digital signal to the microcomputer 20.

The microcomputer 20 receives the digital signal from the modem 21 and grasps the operational status of each of the carriages 4A–4C to generate a new instruction signal. According to this embodiment, the trolley line to which the communication-signal-superimposed electric power from the operation control unit 6 is transmitted may differ from the trolley line to which the communication-signal-superimposed electric power from each of the carriages 4A–4C is transmitted.

According to this embodiment, as discussed above, communication between each of the carriages 4A–4C and the operation control unit 6 is accomplished by the following scheme.

1) Superimposition of the communication signal SG on the electric power PS, which is to be transmitted onto the trolley line 11 B.
2) Reception of the electric power PSmix with the superimposed communication signal SG at the reception antenna 15 or 23.
3) Extraction of the analog communication signal SG in the modem 21 or 30.
4) Conversion of the analog communication signal SG to a digital communication signal.
5) Provision of the digital communication signal to the operation controller 31 or the microcomputer 20 of the operation control unit 6.

This scheme therefore eliminates the need for any communication line and thus for the work of laying a communication-purpose trolley line for that matter. This scheme further eliminates the need for the space on the guide rail 3 and each carriage 4A, 4B or 4C to otherwise accommodate such a communication-purpose trolley line. This permits to downsizing of the guide rail 3 and the carriages 4A–4C.

The reception and transmission antennas 15 and 17 of each of the carriages 4A–4C are not in contact with the trolley line 11B, thus suppressing the wearing of the trolley line 11B.

In addition, reliable communication is established between each carriage 4A, 4B or 4C and the operation control unit 6 regardless of where the carriage 4A, 4B or 4C is running.

The 3-phase AC supply voltage used as a carrier has a frequency of 60 hertz (or 50 hertz), which is lower than that of the communication signal SG, which ranges from 200 megahertz to 300 megahertz. This facilitates the superimposition of the communication signal SG on the carrier and the extraction of the communication signal SG from the carrier.

A non-contact type unmanned conveying system according to a second embodiment of the invention will be described below with reference to the accompanying drawings. To avoid the redundant description, like or same reference numerals are given to those components that are like or the same as corresponding components of the first embodiment.

Figure 8:
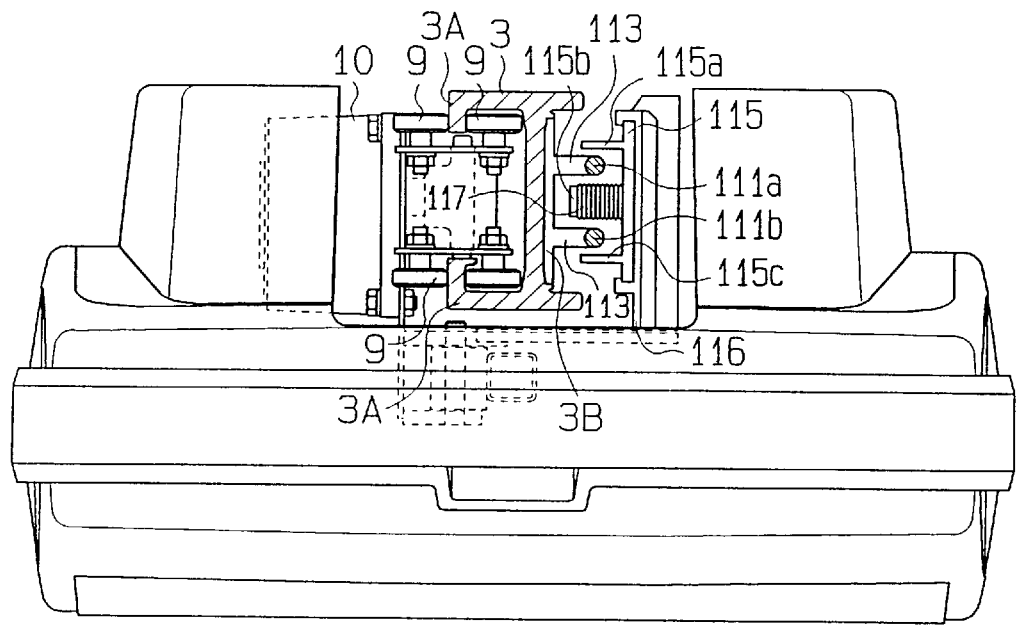
FIG. 8 is a front view of a carriage showing the relationship between a pickup coil and power supply lines according to a second embodiment of the invention.

As shown in FIG. 8, upper and lower power supply lines 111a and 111b are laid on the side 3B of the guide rail 3 via a pair of support arms 113, and a given interval is maintained therebetween. The upper power supply line 111a and lower power supply line 111b are formed by a single litz wire folded at a midway. The upper power supply line 111a and lower power supply line 111b have one end connected to the power supply unit 12 via a pair of power lines 110, respectively. According to the second embodiment, the AC power of the power supply unit 12 has a voltage of 200 volts and a high frequency of 10 kilohertz.

A pair of brackets 116 (only one shown in FIG. 8) are provided on the base (not shown) of each carriage 4A, 4B or 4C at a predetermined distance from the power supply lines 111a and 111b. Secured to each bracket 116 is a ferrite core 115, which faces the power supply lines 111a and 111b and whose cross section has nearly a shape of "E". Each ferrite core 115 has an upper projection 115a, a middle projection 115b and a lower projection 115c. The upper projection 115a is formed to extend toward the side 3B of the guide rail 3 above the upper power supply line 111a. The middle projection 115b is formed to extend toward the side 3B between the upper power supply line 111a and the lower power supply line 111b. The lower projection 115c is formed to extend toward the side 3B below the lower power supply line 111b. An induction coil or pickup coil 117 is attached to the middle projection 115b.

When electric power having a voltage of 200 volts and a high frequency of 10 kilohertz flows in the power supply lines 111a and 111b, a magnetic flux is produced in the power supply lines 111a and 111b. The magnetic flux causes the pickup coil 117 to generate induced electromotive force. This induced electromotive force is used as the drive voltage for an operation controller 119 of each carriage 4A, 4B or 4C as well as the drive voltage for the drive motor 10.

Figure 9:
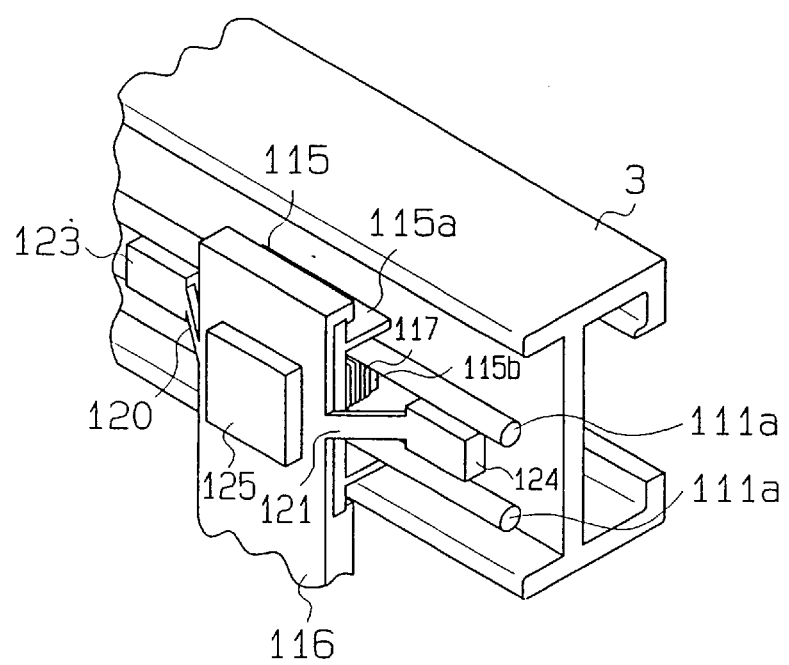
FIG. 9 is a partial perspective view of the carriage in FIG. 8, which shows the relationship between transmission and reception antennas and power supply lines according to the second embodiment of the invention.

As shown in FIG. 9, the bracket 116 has a first side (top surface) to which the ferrite core 115 is fixed, and a second side (back surface). First and second arms 120 and 121 each having a distal end are secured to those two sides. A transmission antenna 123 is attached to the distal end of the first arm 120, and a reception antenna 124 is attached to the distal end of the second arm 121. The transmission and reception antennas 123, 124 are arranged not to contact the upper power supply line 111a and the lower power supply line 111b therebetween. According to the second embodiment, the transmission and reception antennas 123, 124 have coil shapes directions of which are the same as when the pickup coil 117 is attached. Attached to the second side (back surface) of the bracket 116 is a control box 125 which incorporates various control circuits like the operation controller 119 and a modem 126.

Figure 10:
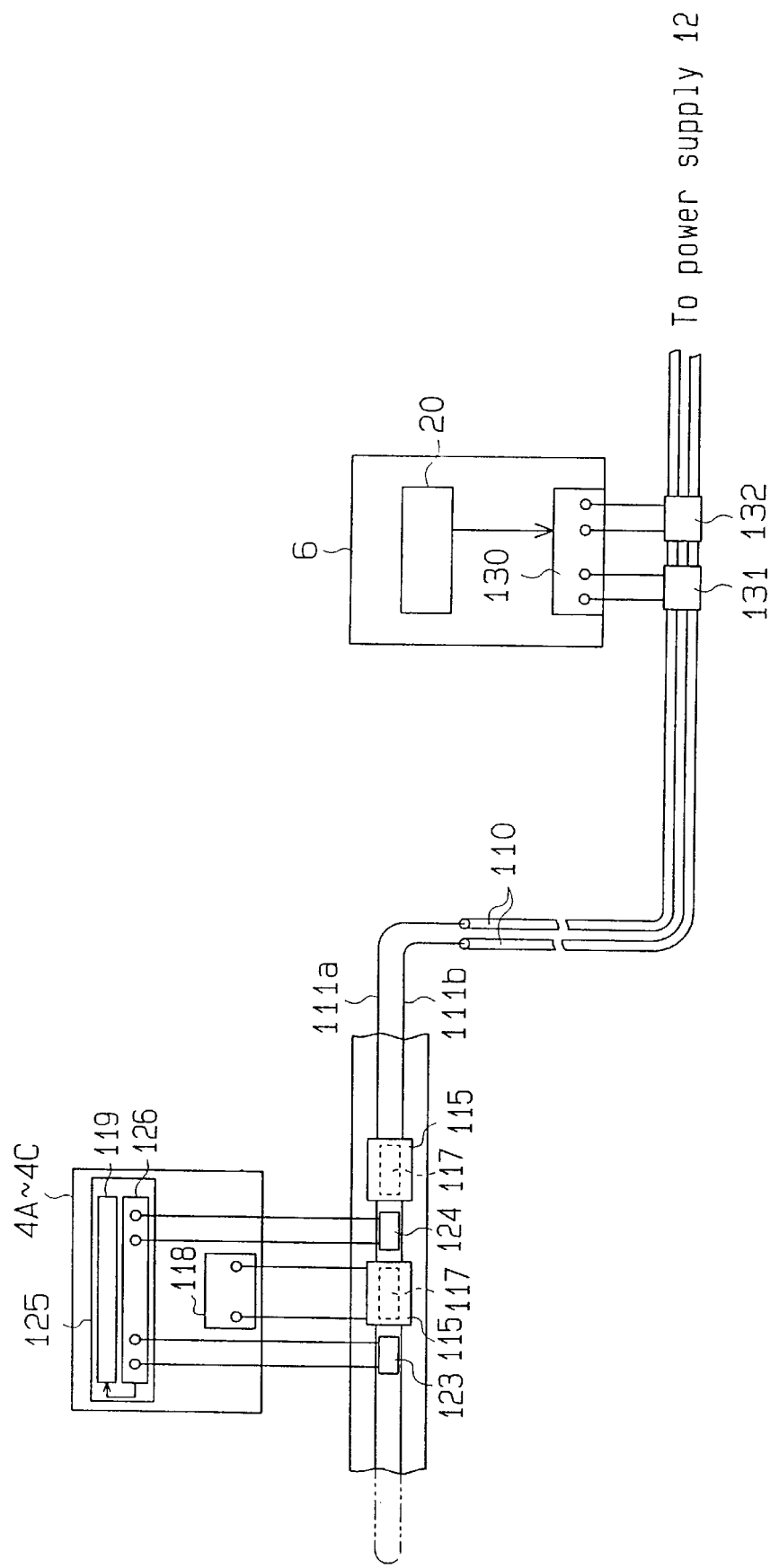
FIG. 10 shows a power supply path, a carriage and an operation control unit in an unmanned conveying system according to the second embodiment of the invention.

As shown in FIG. 10, the transmission and reception antennas 123 and 124 are electrically connected to the modem 126. The operation control unit 6 has a ground modem 130 to which a ground transmission antenna 131 and a ground reception antenna 132 are electrically connected. Each of the ground transmission and reception antennas 131 and 132 is a coil-shaped antenna located around a pair of power lines 110 via insulators.

Figure 11:
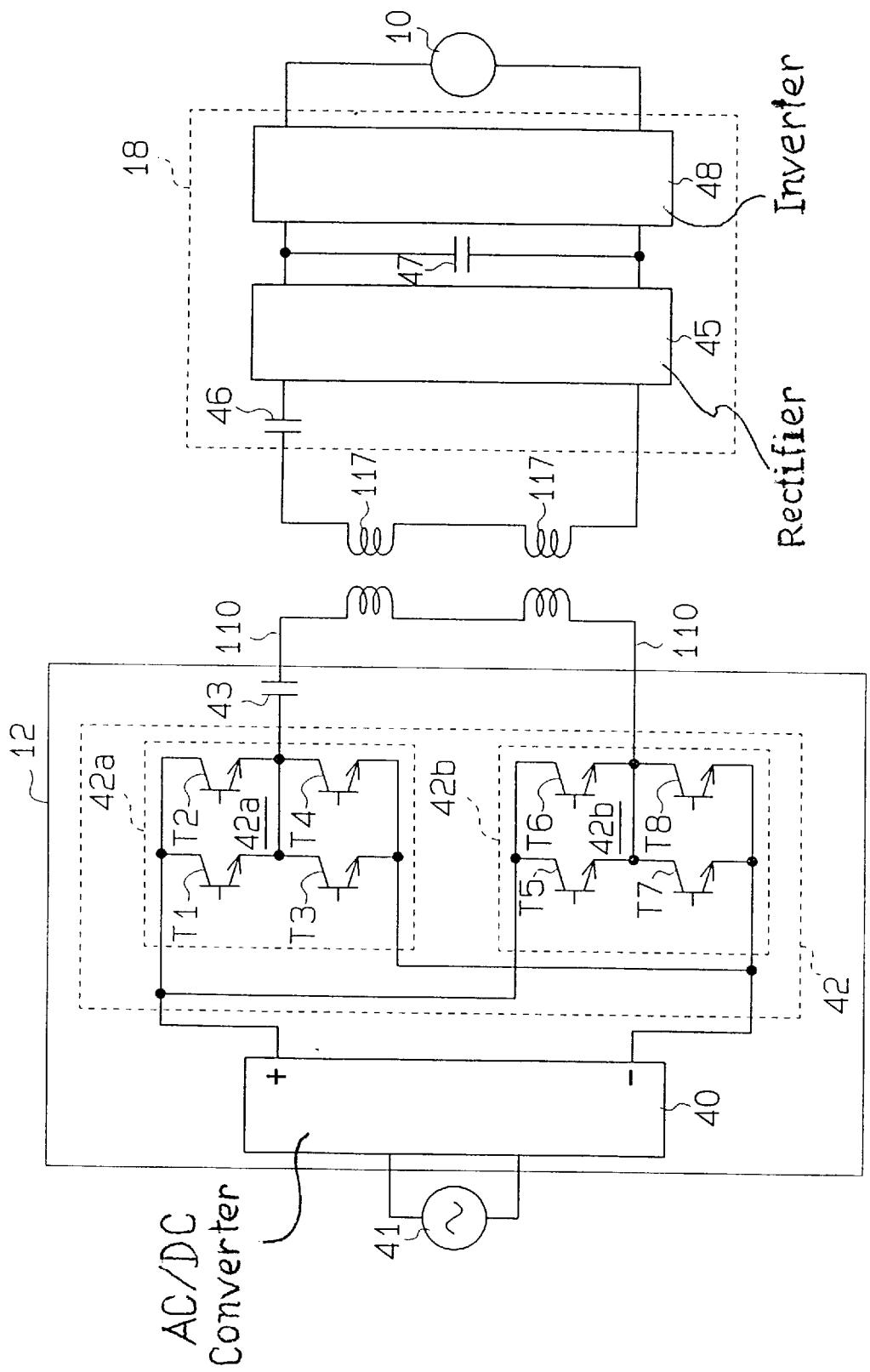
FIG. 11 is a circuit diagram illustrating a power supply unit on the ground side and a power supply unit of a carriage in the unmanned conveying system according to the second embodiment of the invention.

FIG. 11 is an electric circuit diagram showing the ground power supply unit 12 and a power supply unit 18 installed on each carriage 4A, 4B or 4C. The ground power supply unit 12 has an AC/DC converter 40, a DC/AC converter 42 and a resonance capacitor 43. The AC/DC converter 40, connected to a 3-phase power supply 41 having a voltage of 200 volts and a frequency of 60 hertz, converts the 3-phase AC supply voltage to a 200-V DC voltage. The DC/AC converter 42, connected to the AC/DC converter 40, receives the DC supply voltage from the AC/DC converter 40 and produces electric power having a voltage of 200 volts and a high frequency of 10 kilohertz.

The DC/AC converter 42 includes a first driver section 42a and a second driver section 42b which are connected in parallel to the AC/DC converter 40. The first driver section 42a has an output terminal connected to one end of one of the power lines 110 via the resonance capacitor 43. The second driver section 42b has an output terminal connected to one end of the other power line 110.

The first driver section 42a includes two upper transistors T1, T2 and two lower transistors T3, T4. The upper transistors T1, T2 have collectors connected to the positive terminal of the AC/DC converter 40 and emitters. The lower transistors T3, T4 have emitters connected to the negative terminal of the AC/DC converter 40 and collectors respectively connected to the emitters of the upper transistors T1 and T2. The node between the emitters of the upper transistors T1, T2 and the collectors of the lower transistors T3, T4 forms the output terminal of the first driver section 42a.

The second driver section 42b includes two upper transistors T5, T6 and two lower transistors T7, T8. The upper transistors T5, T6 have collectors connected to the positive terminal of the AC/DC converter 40 and emitters. The lower transistors T7, T8 have emitters connected to the negative terminal of the AC/DC converter 40 and collectors respectively connected to the emitters of the upper transistors T5, T6. The node between the emitters of the upper transistors T5, T6 and the collectors of the lower transistors T7, T8 forms the output terminal of the second driver section 42b. The ON/OFF actions of individual transistors T1–T8 are controlled by an unillustrated controller in the power supply unit 12. As a result of this control, electric power having a voltage of 200 volts and a high frequency of 10 kilohertz is generated.

This ON/OFF control will be discussed more specifically. The ON/OFF actions of the upper transistors T1, T2 and the lower transistors T7, T8 are synchronously controlled. The ON/OFF actions of the lower transistors T3, T4 and the upper transistors T5, T6 are synchronously controlled. That is, while the upper transistors T1, T2 and the lower transistors T7, T8 are enabled, the lower transistors T3, T4 and the upper transistors T5, T6 are disabled. While the upper transistors T1, T2 and the lower transistors T7, T8 are disabled, on the other hand, the lower transistors T3, T4 and the upper transistors T5, T6 are enabled.

The power supply unit 18 includes a rectifier 45, an output-adjusting capacitor 46, a smoothing capacitor 47 and an inverter 48. One pair of pickup coils 117 of each carriage 4A, 4B or 4C are connected in series. The rectifier 45 has two input terminals connected to a series circuit of the pair of pickup coils 117 and the output-adjusting capacitor 46 and has two output terminals connected to a parallel circuit of the smoothing capacitor 47 and the inverter 48. The rectifier 45 receives the induced electromotive force, produced by the pickup coils 117, from the input terminals and rectifies the induced electromotive force. The inverter 48 receives the rectified induced electromotive force via the smoothing capacitor 47 and performs voltage and frequency conversion to produce a 3-phase AC supply voltage. This 3-phase AC supply voltage is supplied to the drive motor 10.

Figure 12:
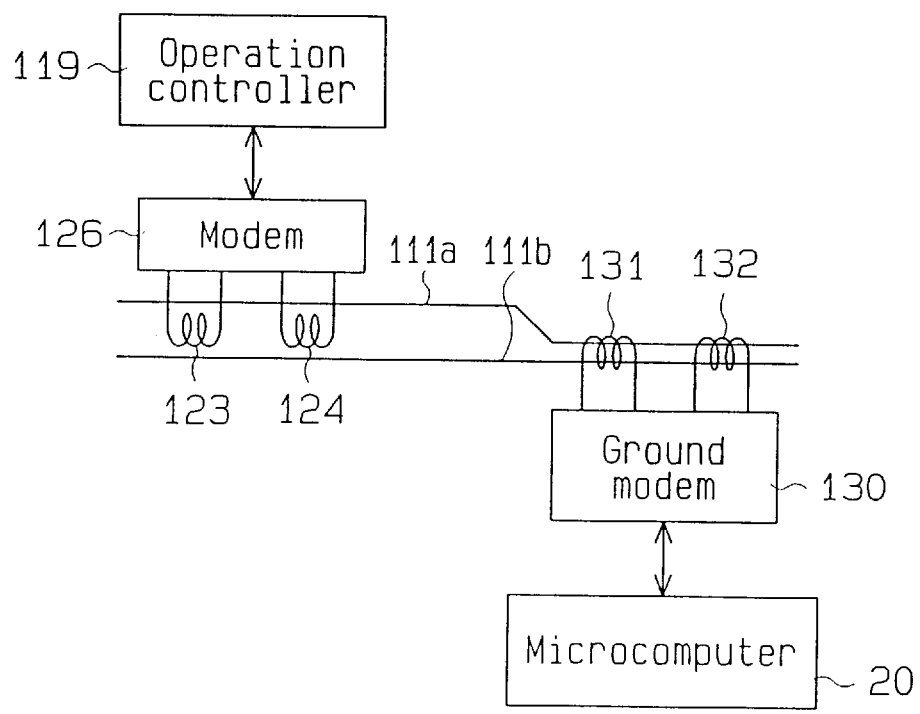
FIG. 12 illustrates communication between a carriage and the operation control unit according to the second embodiment of the invention.

Communications in the above-described unmanned conveying system are conducted as follows. As illustrated in FIG. 12, the microcomputer 20 in the operation control unit 6 sends out a digital instruction signal for the driving and the loading/unloading of each of the carriages 4A–4C, to the ground modem 130. The ground modem 130 converts the digital instruction signal to an analog signal having a frequency of 200 to 300 megahertz and sends this analog signal as the communication signal SG to the ground transmission antenna 131. The communication signal SG, the frequency of which ranges from 200 megahertz to 300 megahertz, flows in the power lines 110 and is superimposed on the electric power PS having a frequency of 10 kilohertz. The electric power PSmix with superimposed communication signal SG is supplied to the power supply lines 111a, 111b.

The reception antenna 124 receives the electric power PSmix and generates a feeble induced electromotive force corresponding to the electric power PSmix. The modem 126 receives the induced electromotive force from the reception antenna 124 and acquires the communication signal SG from the induced electromotive force. The modem 126 converts the acquired communication signal SG to a digital signal and supplies this digital signal to the operation controller 119 as an instruction signal from the operation control unit 6. When determining that the instruction signal is addressed to itself, the operation controller 119 drives the drive motor 10 in accordance with that instruction signal.

The operation controller 119 sends a digital signal indicating the operational status of each carriage 4A, 4B or 4C to the modem 126. The modem 126 converts the digital signal to an analog signal having a frequency of 200 to 300 megahertz and sends this analog signal to the transmission antenna 123 as the communication signal SG. The communication signal SG, frequency of which ranges from 200 megahertz to 300 megahertz, is transmitted onto the power supply lines 111a, 111b and is superimposed on the electric power PS having a frequency of 10 kilohertz. The electric power PSmix having the communication signal SG superimposed thereon is transmitted to the power lines 110.

The ground reception antenna 132 receives the electric power PSmix and generates feeble induced electromotive force corresponding to the electric power PSmix. The ground modem 130 acquires the communication signal SG from the induced electromotive force and converts the acquired communication signal SG to a digital signal. This digital signal is supplied to the microcomputer 20 as a signal from the associated one of the carriages 4A–4C. The microcomputer 20 grasps the operational statuses of the individual carriages 4A–4C based on the signals from the individual carriages 4A4C and generates a new instruction signal.

This structure therefore eliminates the need for a communication line, which is required in the conventional cable-based communication and thus eliminates the labor of laying a communication-purpose trolley line along the guide rail 3. When the guide rail is laid in a wide area, the ground station does not need radio devices to ensure radio communications with conventional movable bodies. It is thus unnecessary to provide communication cables for electrically connecting one ground station to the individual radio devices. The reception antenna 124 and the transmission antenna 123 are located between one pair of power supply lines 111a, 111b. This permits the reception antenna 124 to receive the electric power PSmix with a high sensitivity and permits the transmission antenna 123 to efficiently transmit a communication signal.

Although two embodiments of the present invention have been described herein, it should be apparent to those skilled in the art that the present invention may be embodied in many other specific forms without departing from the spirit or scope of the invention. Particularly, it should be understood that this invention may be embodied in the following forms.

This invention may be adapted to an unmanned conveying system or an automatic warehouse system in which carriages run on a guide rail laid on the ground. Only one of the reception antenna 15 or 124 and the transmission antenna 17 or 123 may be used as the reception and transmission antenna. Only one of the ground reception antenna 22 or 131 and the transmission antenna 23 or 132 may be used as the reception and transmission antenna. The system of supplying power to the carriages 4A–4C is not limited to the one using 3-phase lines (3-phase three lines) in association with the 3-phase AC supply voltage, but other power supply systems, such as 3-phase four lines (including the ground line), single-phase two lines, single-phase three lines or DC, may be used as well.

Therefore, the present examples and embodiments are to be considered as illustrative and not restrictive and the invention is not to be limited to the details given herein, but may be modified within the scope of the appended claims.

What is claimed is:

1. In an operating system for a movable body that runs on a guide rail, a communication method for establishing communications between said movable body and an operation control unit for controlling running of said movable body, power lines on which electric power is transmitted being laid on said guide rail, said movable body having a reception antenna and a transmission antenna, both in proximity to said power lines, and being runnable upon reception of said electric power from said power lines, said method comprising the steps of:

(a) generating a communication signal in said movable body;
   (b) superimposing said communication signal on electric power transmitted on said power lines using said transmission antenna;
   (c) receiving electric power with superimposed communication signal at said movable body from said operation control unit using said reception antenna; and
   (d) acquiring said communication signal from said received electric power.

2. In an operating system for a movable body that runs on a guide rail, a communication method for establishing communications between said movable body and an operation control unit for controlling running of said movable body wherein said operation control unit has a reception antenna, and a transmission antenna, both in proximity to power lines laid on said guide rail on which electric power is transmitted, said movable body being runnable upon reception of said electric power from said power lines, said method comprising the steps of:

(a) generating a communication signal in said operation control unit;
   (b) superimposing a communication signal from said operation control unit on electric power transmitted on said power lines using said transmission antenna;
   (c) receiving electric power with superimposed communication signal from said movable body unit using said reception antenna; and
   (d) acquiring said communication signal from said received electric power.

3. In an operating system for a movable body that runs on a guide rail, a communication method for establishing communications between said movable body and an operation control unit for controlling running of said movable body, power lines on which electric power is transmitted being laid on said guide rail, said movable body having an induction coil arranged in the vicinity of said power lines for receiving electric power transmitted on said power lines and generating induced electromotive force according to said electric power, said movable body being runnable upon reception of said electric power from said power lines, said movable body also having a reception antenna and a transmission antenna both arranged in the vicinity of said power lines, wherein said power lines include a single AC line having an upper line and a lower line laid in parallel along said guide rail, and wherein said reception antenna and said transmission antenna are located between said upper line and said lower line.

said method comprising the steps of:
   (a) generating a communication signal in one of said movable body and said operation control unit;
   (b) superimposing said communication signal on electric power transmitted on said power lines;
   (c) receiving said electric power with said superimposed communication signal at the other one of said movable body and said operation control unit; and
   (d) acquiring said communication signal from said received electric power.

4. In an operating system for a movable body which runs on a guide rail, a communication method for establishing communications between said movable body and an operation control unit for controlling running of said movable body, trolley lines on which electric power is transmitted being laid on said guide rail, said movable body having a collector ring contactable with said trolley lines to said receive electric power, said operation control unit having a first reception antenna and a first transmission antenna, both in proximity to said trolley lines, said movable body having a second reception antenna and a second transmission antenna, both in proximity to said trolley lines, said method comprising the steps of:

(a) generating a first communication signal in said operation control unit;
   (b) superimposing said first communication signal on electric power to be transmitted on said trolley lines using said first transmission antenna;
   (c) receiving said electric power with said superimposed first communication signal at said movable body using said second reception antenna;
   (d) acquiring said first communication signal from said received electric power;
   (e) generating a second communication signal in said movable body;
   (f) superimposing said second communication signal on electric power to be transmitted on said trolley lines using said second transmission antenna;
   (g) receiving said electric power with said superimposed second communication signal at said operation control unit using said first reception antenna; and
   (h) acquiring said second communication signal from said received power.

5. In an operating system for a movable body which runs on a guide rail, a communication method for establishing communications between said movable body and an operation control unit for controlling running of said movable body, AC lines on which electric power is transmitted being laid on said guide rail, said movable body having an induction coil, arranged in the vicinity of said AC lines, for receiving electric power transmitted on said AC lines and for generating induced electromotive force according to said electric power, said operation control unit having a first reception antenna and a first transmission antenna, both in proximity to said AC lines, said movable body having a second reception antenna and a second transmission antenna, both in proximity to said AC lines, said method comprising the steps of:

(a) generating a first communication signal in said operation control unit;
   (b) superimposing said first communication signal on electric power to be transmitted on said AC lines using said first transmission antenna;

(c) receiving said electric power with said superimposed first communication signal at said movable body using said second reception antenna;

(d) acquiring said first communication signal from said received electric power;

(e) generating a second communication signal in said movable body;

(f) superimposing said second communication signal on electric power to be transmitted on said AC lines using said second transmission antenna;

(g) receiving said electric power with said superimposed second communication signal at said operation control unit using said first reception antenna; and (h) acquiring said second communication signal from said received power.

6. A movable body operating system comprising:

a guide rail;

a movable body runnable on said guide rail;

trolley lines laid along said guide rail, electric power being transmitted on said trolley lines, said movable body having a collector ring contactable said trolley lines to receive said electric power therefrom and a drive motor driven by said electric power; and an operation control unit for generating a digital instruction signal for said movable body, said operation control unit including:

a first modem for converting said digital instruction signal to an analog communication signal, and a control transmission antenna connected to said first modem and located in the vicinity of said trolley lines, said control transmission antenna being used for receiving said analog communication signal from said first modem and superimposing said analog communication signal on electric power to be transmitted on said trolley lines, wherein said movable body includes:

a mobile reception antenna, located in the vicinity of said trolley lines, for receiving electric power on which said analog communication signal transmitted on said trolley lines is superimposed, a second modem, connected to said mobile reception antenna, for receiving said received electric power from said mobile reception antenna and extracting said analog communication signal from said electric power to generate said digital instruction signal, and an operation controller, connected to said second modem, for receiving said digital instruction signal from said second modem and controlling driving of said drive motor in accordance with said digital instruction signal.

7. The movable body operating system according to claim 6, wherein said operation controller generates a digital signal indicating an operational status of said movable body, wherein said second modem receives said digital signal from said operation controller and converts said digital signal to an analog communication signal;

wherein said movable body further includes a movable transmission antenna, connected to said second modem and located in the vicinity of said trolley lines, said mobile transmission antenna being used for receiving said analog communication signal from said second modem and superimposing said analog communication signal on electric power to be transmitted on said trolley lines;

wherein said operation control unit further includes a control reception antenna, connected to said first modem and located in the vicinity of said trolley lines, said control reception antenna being used for receiving electric power on which said analog communication signal transmitted on said trolley lines is superimposed; and wherein said first modem receives received electric power from said control reception antenna, extracts said analog communication signal from said electric power and generates said digital signal indicating said operational status of said movable body.

8. A movable body operating system comprising:

a guide rail;

a movable body runnable on said guide rail;

AC lines laid along said guide rail, electric power being transmitted on said AC lines, said movable body having an induction coil, arranged in the vicinity of said AC lines, for receiving electric power transmitted on said AC lines and for generating induced electromotive force according to said electric power, wherein said movable body has a drive motor driven by said induced electromotive force; and an operation control unit for generating a digital instruction signal for said movable body, said operation control unit including:

a first modem for converting said digital instruction signal to an analog communication signal, and a control transmission antenna connected to said first modem and located in the vicinity of said AC lines, said control transmission antenna being used for receiving said analog communication signal from said first modem and superimposing said analog communication signal on electric power to be transmitted on said AC lines, wherein said movable body includes:

a mobile reception antenna, located in the vicinity of said AC lines, for receiving electric power on which said analog communication signal transmitted on said AC lines is superimposed, a second modem, connected to said mobile reception antenna, for receiving said received electric power from said mobile reception antenna and extracting said analog communication signal from said electric power to generate said digital instruction signal, and an operation controller, connected to said second modem, for receiving said digital instruction signal from said second modem and controlling driving of said drive motor in accordance with said digital instruction signal.

9. The movable body operating system according to claim 8, wherein said operation controller generates a digital signal indicating an operational status of said movable body, wherein said second modem receives said digital signal from said operation controller and converts said digital signal to an analog communication signal;

wherein said movable body further includes a movable transmission antenna, connected to said second modem and located in the vicinity of said AC lines, said mobile transmission antenna being used for receiving said analog communication signal from said second modem and superimposing said analog communication signal on electric power to be transmitted on said AC lines;

wherein said operation control unit further includes a control reception antenna, connected to said first modem and located in the vicinity of said AC lines, said control reception antenna being used for receiving electric power on which said analog communication signal transmitted on said AC lines is superimposed; and wherein said first modem receives received electric power from said control reception antenna, extracts said analog communication signal from said electric power and generates said digital signal indicating said operational status of said movable body.

* * * * *